Aug. 16, 1955　　　　R. A. SHIELDS　　　　2,715,550
TANK CAR FOR PULVERULENT MATERIALS
Filed June 7, 1950　　　　　　　　　　　　2 Sheets-Sheet 1
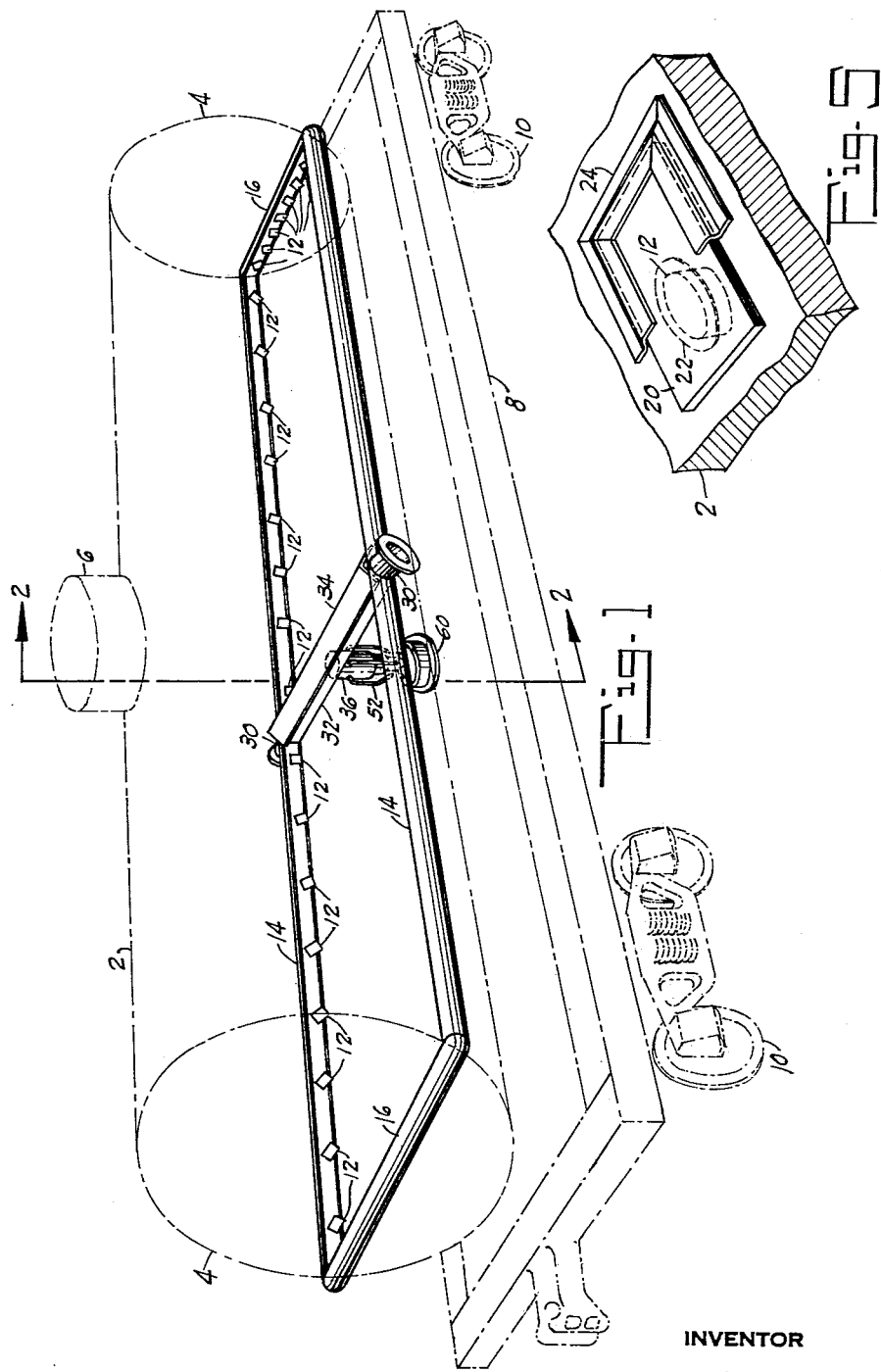
INVENTOR
Robert A. Shields Aug. 16, 1955    R. A. SHIELDS    2,715,550
TANK CAR FOR PULVERULENT MATERIALS
Filed June 7, 1950    2 Sheets-Sheet 2
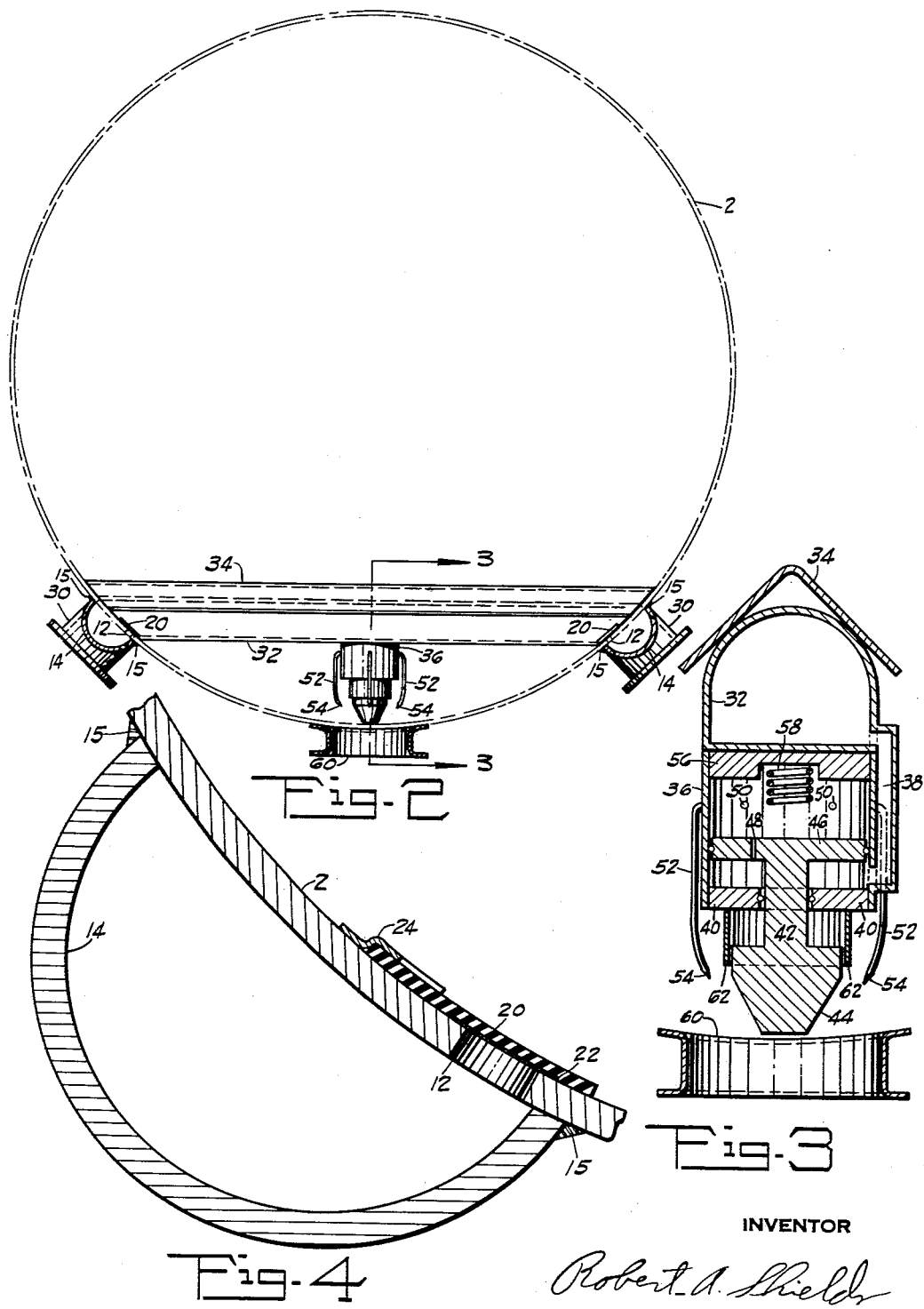
INVENTOR
Robert A. Shields United States Patent Office 2,715,550
Patented Aug. 16, 1955

2,715,550

TANK CAR FOR PULVERULENT MATERIALS

Robert A. Shields, Bloomsburg, Pa., assignor to ACF Industries Incorporated, a corporation of New Jersey Application June 7, 1950, Serial No. 166,755

11 Claims. (Cl. 302—53)

This invention relates to tank cars in general and in particular to tank cars intended to carry pulverulent or granular material in bulk and for pneumatic discharge.

The major proportion of pulverulent or granular materials shipped at the present time are carried in small packages made of paper or cloth. Such shipment is expensive not only due to the cost of the packages, but also to the excessive handling charges and labor required to fill and discharge the packages. Recently, small percentages of pulverulent and granular materials have been shipped in small metallic containers, but even here the cost is higher than if the materials were shipped in larger quantities such as thirty or forty tons to the container. In shipping any of the pulverulent or granular materials it is highly desirable that all the material be discharged from the container and this becomes extremely necessary is cases where food stuffs, such as sugar, flour, etc., are being transported. Unless all of this material is discharged the portions remaining are apt to become stale and may spoil the entire load during transit. It is an object, therefore, of the present invention to provide a tank car capable of transporting large quantities of pulverulent or granular material and which car has a substantially smoother interior.

A further object of the invention is the provision of a tank car for transporting pulverulent or granular material and having attached thereto external piping whereby the tank car may be pneumatically discharged.

A still further object of the invention is the provision of a tank car having piping connected thereto and including vibrator means for loosening the material.

Yet another object of the invention is the provision of a tank car for transporting pulverulent or granular material, which tank has a substantially smooth interior with openings therethrough covered by flap valves.

These and other objects of the invention will be apparent to persons skilled in the art from a study of the following description and accompanying drawings, in which Fig. 1 is a perspective view of the improved tank car with the tank shell being shown in phantom by line and dash to better disclose the piping arrangement;

Fig. 2 is a sectional view through the tank and taken at one side of the center;

Fig. 3 is an enlarged sectional view taken substantially on line 3—3 of Fig. 2;

Fig. 4 is an enlarged sectional view taken through the pipe and tank shell to better disclose the flap valve construction, and Fig. 5 is a perspective view of one of the flap valves as seen from the tank interior.

Referring now to the drawings in detail it will be seen that the tank car is of more or less standard construction, formed by a cylindrical shell 2 closed at its ends by dished or similarly shaped ends 4 and pierced substantially at its top center to receive a dome 6 through which the tank may be filled. The tank is mounted on the underframe 8 carried on trucks 10. The tank shell 2 is pierced by a plurality of holes 12 which extend through the tank shell preferably in the area where a forty-five degree plane will be tangent to the tank shell. Such an angle is generally above the angle of repose of any lading which might be carried and accordingly the lading will of its own weight slide downwardly to points slightly below the row of holes 12 through the tank shell. Extending continuously along the sides of the tank shell are a pair of half pipes 14 having their outer edges welded as at 15 to the shell 2, thus forming with the shell a closed semi-cylindrical pipe. The ends of the side pipes 14 are connected by a pair of similar half pipes 16 extending across and butt welded or otherwise secured to the ends 4 of the tank shell. The tank ends, like the tank sides, are pierced with holes arranged exactly as are the holes 12 in the half pipes 14. The holes 12 on the tank side walls and ends are covered by flap valves 20 preferably made of rubber or other elastic or suitable flexible material and having vulcanized or otherwise secured to their inner surfaces discs of thin metal, such as 22, which discs will prevent the elastic material from sagging into the holes 12. The elastic material is held in place by frames 24 preferably of Z cross-section and which frame may be vulcanized or otherwise secured to the elastic member 20. The edges of the frame 24 may be spot welded or otherwise secured to the inner faces of the tank shell 2 and ends 4. As clearly shown in Fig. 1, these frames are so arranged that the line joining the center of frame 24 and disc 22 is directed downwardly and toward the center of the car at varying degrees, dependent upon the position of the flap valve in the car. In other words, the flap valves covering the holes 12 adjacent the center of the tank car will be directed downwardly in almost a vertical direction as viewed from the side, whereas those adjacent the ends of the car will be inclined at a considerable angle to the vertical, the effect being that the discharge from the flap valves will tend to move the material toward the bottom of the tank and along the bottom toward the discharge outlet. The flap valves on the tank end wall will also have their center lines directing downwardly and toward the bottom center line of the car as clearly shown in Fig. 1.

Air or other suitable material under pressure will be supplied to half pipes 14 through short connections 30 welded into the pipes 14 on either side of the tank so that connections may be made to either or both sides of the tank and the connection not in use will be closed by the conventional cap. Extending across the tank, preferably in line with the inlets 30, is a semi-cylindrical pipe 32 having its ends welded or otherwise secured to the tank shell. The cross pipe 32 is protected against injury by an inverted V deflector 34 which has its ends likewise welded to the tank shell. The half pipe 32 and deflector plates 34 will form a rigid tie joining the tank shell in the zone of and in alignment with the half pipes 14 and any vibration which arises in this rigid cross tie will be imparted directly to the tank shell.

In order to vibrate the rigid cross tie a power cylinder 36 is welded or otherwise secured to the lower surface of the cross pipe 32 and will be supplied by air or other medium by passage 38 leading from the pipe 32 to the bottom of cylinder 36. The lower end of the cylinder is closed by a closure plate 40 having an opening therein through which a piston rod 42 may extend. Upon the lower end of the piston rod is mounted a truncated cylindrical end 44, while on the upper end is mounted the piston head 46. O-ring or similar seals are provided between the piston head 46 and the cylinder walls and between the piston rod 42 and the walls of the opening in end 40. As shown, the piston head 46 has one or more small holes 48 drilled therethrough in order that air or other material may freely pass from the lower side of the piston to the upper side. Openings 50 extend through the cylinder walls 36 adjacent the upper end thereof and have pipes 52 connected thereto and extending downwardly and thence inwardly as at 54 so as to give a directed discharge port to the discharge outlet 60 which is preferably connected to the bottom of the tank shell, as clearly shown in Figs. 1 and 2. The upper end of the cylinder 36 has mounted therein an impact plate 56 and this plate is recessed to receive a relatively light spring 58. In order to protect the truncated cylindrical end 44 a cylindrical skirt 62 is welded or otherwise secured to the cylinder bottom wall 40 and closely engages the side of the projection 44, thus preventing flour or other material entering or becoming packed in the space between the projection and the cylinder end wall.

When air or other suitable fluid is supplied under pressure to one or more of the connections 30 it will completely fill half pipes 14, 16 and 32 and cause the flap valves to open slightly and discharge a thin sheet of air or other matter downwardly and toward the center of the car dependent upon the inclination of the flap valves. At the same time the air or other fluid in pipe 32 will flow through passage 38 to the space between the piston 46 and cylinder bottom wall 40. This air or other fluid under pressure will drive the piston upwardly and against the impact plate 56. When the piston strikes the impact plate the exhaust openings 50 will be exposed beneath the piston 46 and the air or other fluid will exhaust through the directing nozzles 54. Air or other fluid entering above the piston through passage or passages 48 will, together with the spring 58, force the piston downwardly in a rebound which carries it below the exhaust ports 50. As soon as this downward inertia has been overcome it will again be driven upwardly against the impact plate. Thus, it will be seen that a plurality of impacts or vibrations will be delivered to the rigid cross pipe 32 and protecting plate 34. These vibrations will be transmitted to the entire tank shell and tend to loosen the lading and break down any bridges which may tend to form above the flap valves 20. Also, the rapidly reciprocating cylindrical plunger 44 will tend to break up any chunks of material which may be moved to the discharge outlet and likewise discharge will be aided by the directed jets 54 which are connected to the exhaust ports of the cylinder 36.

It will, of course, be obvious that a rotary type vibrator may be substituted for the reciprocating type shown and that vibrators may be connected at other points in the pipe lines 14 and 16. It will also be obvious that valves other than the flap valves 20 may be used to cover the openings 12 without in any way departing from the scope of the invention as defined by the claims.

What is claimed is:

1. In a railway car, a horizontally disposed cylindrically curved shell, ends closing the shell and forming a horizontally disposed elongated body, a discharge outlet in the lower portion of the horizontally disposed shell, and continuous closed conduit means secured to the exterior surface of the shell and ends and adapted to receive fluid under pressure, said shell and ends having openings therethrough into said conduit means adapted to discharge fluid under pressure in a direction toward the discharge outlet.

2. In a railway car, a horizontally disposed cylindrically curved shell, ends closing the shell and forming a horizontally disposed elongated body, a discharge outlet in the lower portion of the horizontally disposed shell, conduit means secured to the exterior surface of the shell and ends and adapted to receive fluid under pressure, said shell and ends being formed with openings therethrough connecting the body and conduit interior, and means overlying and closing said openings to prevent flow of material from the body into the conduit interior while passing fluid from the conduit into the body in a direction toward said discharge outlet.

3. In a railway car, a horizontally disposed cylindrically curved shell, ends closing the shell and forming a horizontally disposed elongated body, a discharge outlet in the lower portion of the horizontally disposed shell, conduit means secured to the exterior surface of the shell and ends and adapted to receive fluid under pressure, said shell and ends being formed with openings therethrough connecting the body and conduit interior, and means overlappingly covering said openings to prevent flow of material from the body into the conduit interior, said cover means being so constructed and arranged as to permit passage of fluid under pressure from the conduit into the body and direct it toward the discharge outlet.

4. In a railway car, a horizontally disposed cylindrically curved shell, ends closing the shell and forming a horizontally disposed elongated body, a discharge outlet in the lower portion of the horizontally disposed shell, first conduit means surrounding the body and secured to the exterior surface thereof, second conduit means extending across the body interior thereof and secured to the body interior, said conduit means being adapted to receive a pressure medium, said body having openings therethrough connecting the first and second conduits for interchange of pressure medium and connecting the interior of the body with the interior of said first conduit, and vibrator means secured to said second conduit adjacent said discharge outlet.

5. In a railway car, a cylindrically curved shell, ends closing the shell and forming an elongated body, a discharge outlet in the lower portion of the body, half pipes welded to said shell and ends exterior of the body and forming therewith a first conduit of rectangular outline as viewed in plan, a second conduit welded to the shell interior extending across and connected to said first conduit to conduct fluid under pressure, jets connected to said conduits and directed downwardly toward said discharge outlet, and vibrator means connected to said second conduit adjacent said jets and above said outlet.

6. In a railway car, a cylindrically curved shell, ends closing the shell and forming an elongated body, a discharge outlet in the lower portion of the body, half pipes welded to said shell and ends exterior of the body and forming therewith a first conduit of rectangular outline as viewed in plan, a second conduit welded to the shell interior extending across and connected to said first conduit to conduct fluid under pressure, jets connected to said conduits and directed downwardly toward said discharge outlet, and vibrator means connected to said second conduit adjacent said jets and above said outlet, said jets and vibrator means being so constructed and arranged that all fluid under pressure supplied to the jets must flow through the vibrator means.

7. In a railway car, a cylindrically curved shell, ends closing the shell and forming an elongated body to contain pulverulent material, a discharge outlet in the lower portion of the body, a conduit welded to the shell interior and extending thereacross substantially above the discharge outlet, means to supply fluid under pressure to the conduit, a vibrator connected to said conduit and operable by the fluid under pressure in the conduit, and exhaust jets connected to said vibrator and directed downwardly toward said discharge outlet.

8. In a railway car, a cylindrically curved shell, ends closing the shell and forming an elongated body to contain pulverulent material, a discharge outlet in the lower portion of the body, a conduit welded to the shell interior and extending thereacross substantially above the discharge outlet, means to supply fluid under pressure to the conduit, a vibrator connected to said conduit and operable by the fluid under pressure in the conduit, and exhaust jets connected to said vibrator and directed downwardly toward said discharge outlet, said vibrator also including means to break and agitate material above the discharge outlet.

9. In a container for pulverulent material, a shell forming the body of the container, a discharge outlet for passage of material out of the container, and fluid driven vibrator means connected to and adapted to vibrate the shell to assist passage of material out of the container, said vibrator means including a portion adapted to reciprocate vertically above said outlet to break up material prior to passage through the outlet, and jet means operating in timed relation to the reciprocating portion thereby aiding the passage of material through the outlet.

10. In a container for pulverulent material, a shell forming the body of the container, a discharge outlet for passage of material out of the container, and vibrator means connected to and adapted to vibrate the shell to assist passage of material out of the container, said vibrator means including a plunger portion adapted to reciprocate vertically above said outlet to break up material prior to passage through the outlet, and also including jet means pulsating in timed relation to the vibrator to assist movement of material through the outlet.

11. In a railway car, a cylindrically curved shell, ends closing the shell and forming an elongated body to contain pulverulent material, a discharge outlet in the lower portion of the shell, conduit means secured to the exterior surface of the shell and ends and adapted to receive fluid under pressure, said shell and ends being formed with openings therethrough connecting the body and conduit interior, and flexible means secured to the inner faces of the shell and ends overlappingly covering said openings whereby said means and shell form valves adapted to prevent flow of pulverulent material from the body into the conduit interior and to permit passage of fluid under pressure from the conduit into the body and direct it toward the discharge outlet.

References Cited in the file of this patent

UNITED STATES PATENTS

| | | |
|---|---|---|
| 1,240,409 | Black | Sept. 18, 1917 |
| 1,339,977 | Pruden | May 11, 1920 |
| 2,108,416 | Smith | Feb. 15, 1938 |
| 2,115,023 | Kennedy et al. | Apr. 26, 1938 |
| 2,174,348 | Damond | Sept. 26, 1939 |
| 2,460,546 | Stephanoff | Feb. 1, 1949 |
| 2,580,215 | Bozich | Dec. 25, 1951 |

FOREIGN PATENTS

| | | |
|---|---|---|
| 325,544 | Great Britain | Feb. 21, 1930 |
| 602,067 | France | Dec. 16, 1925 |
| 708,557 | France | May 4, 1931 |